US005101713A

United States Patent [19]

Heath et al.

[11] Patent Number: 5,101,713

[45] Date of Patent: Apr. 7, 1992

[54] APPARATUS AND METHOD FOR ASEPTICALLY RECONSTITUTING BEVERAGES

[75] Inventors: Harold R. Heath; Jack F. Brumley, both of Houston, Tex.

[73] Assignee: The Coca-Cola Company, Atlanta, Ga.

[21] Appl. No.: 675,778

[22] Filed: Mar. 27, 1991

[51] Int. Cl.[5] .......... A23L 2/00

[52] U.S. Cl. .......... 99/275; 99/452; 99/485; 426/506

[58] Field of Search .......... 99/275, 323.1, 323.2, 99/323.3, 452, 453, 483, 485; 426/506, 399, 455, 402

[56] References Cited

U.S. PATENT DOCUMENTS 1,325,094 12/1919 Hieber .
1,989,399 1/1935 Browne .......... 99/15
2,319,994 5/1943 Ketchum .......... 99/155
2,712,504 7/1955 Coulter .......... 99/212
3,106,895 10/1963 Hood .......... 99/275
3,877,358 4/1975 Karr .......... 99/275
4,139,648 2/1979 Small .......... 426/506
4,148,933 4/1979 Janovtchik .......... 426/402
4,160,002 7/1979 Janovtchik .......... 261/76
4,234,537 11/1980 Hersom et al. .......... 422/26
4,310,476 1/1982 Nahra et al. .......... 261/118
4,416,194 11/1983 Kemp .......... 99/278
4,461,780 7/1984 Menacci .......... 426/521
4,534,986 8/1985 Hasting .......... 426/521
4,534,991 8/1985 Kryger .......... 426/592
4,583,453 8/1987 Torterotot .......... 426/399
4,637,936 1/1987 White et al. .......... 426/523
4,643,902 2/1987 Lawhon et al. .......... 426/271
4,684,531 8/1987 Torterotot .......... 426/399
4,776,268 10/1988 Bronnert .......... 99/453
4,787,304 11/1988 Bronnert .......... 99/453

FOREIGN PATENT DOCUMENTS 2606598 11/1986 France .

*Primary Examiner*—Robert W. Jenkins
*Attorney, Agent, or Firm*—Kenyon & Kenyon

[57] ABSTRACT

The invention provides a method and apparatus for reconstituting beverages wherein superheated reconstituting liquid and beverage concentrate are delivered into a mixing chamber having an adjustable volume. The mixing chamber is the volume between two coaxially arranged tapered elements which are disposed one inside of the other. Final beverage product emanates from an aperture in the tip of the outer tapered element. At least one tapered element can be displaced in the longitudinal direction so that the volume of the mixing chamber decreases and approaches zero as the tapered elements are moved closer together. Thus, when the system is shutdown the volume of the mixing chamber is allowed to approach zero so that very little product is susceptible to degradation in the mixing chamber due to prolonged exposure to high temperatures during a shutdown. The reduced volume mixing chamber may be flushed with reconstituting liquid. In addition, the temperture of the mixing chamber can be controlled during a shutdown by adjusting the temperature of water contained within the walls of the tapered elements.

12 Claims, 4 Drawing Sheets

APPARATUS AND METHOD FOR ASEPTICALLY RECONSTITUTING BEVERAGES

BACKGROUND OF THE INVENTION

1. Field of the Invention

The invention relates to a system for reconstituting beverages using superheated constituting liquid to simultaneously effect a sterilization or pasteurization of the beverages. More particularly, the invention relates to a system of the aforementioned type wherein the reconstituting process can be intermittently interrupted and restarted again without any risk of product degradation or loss of aseptic conditions.

2. Description of Related Art

Various processes for reconstituting and pasteurizing beverages have been described. Reconstitution and pasteurization have been carried out separately. In such processes the heat treatment is carried out indirectly by heating the reconstituted beverage in a tank or directly by injecting high-temperature steam into the beverage. Alternatively, the reconstituted beverage can also be passed as droplets into a jet of high-temperature steam. Indirect heat treatment has the disadvantage of creating undesirable deposits on the tank walls or a caramelization phenomenon. Direct heat treatment has the disadvantage of producing a product having a quantity of excess water which must subsequently be removed.

In an attempt to overcome the disadvantages associated with separated reconstituting and pasteurizing steps, processes have been developed wherein both steps are carried out simultaneously. For example, processes have been developed wherein water is heated to a temperature such that it produces a reconstituted product whose temperature is similar to that at which pasteurization is to be carried out. In accordance with this process superheated water and concentrate continuously flow into a mixing chamber where the reconstituted beverage is aseptically produced.

In processes of this type it is important that all piping and equipment downstream of the mixing chamber remain sterile. Maintaining such aseptic conditions can be problematical where the system is shutdown. During a shutdown sterilization of concentrate in the mixing chamber may be incomplete. The temperature of the mixing chamber will drop during the shutdown. When the system is restarted, unsterile product can emanate from the mixing chamber and pass downstream to contaminate the system. This problem is particularly apparent in the case of a mixing chamber having a large volume.

Attempts have been made to solve the problem of contamination after a shutdown by introducing concentrate into the mixing area from a pipe which runs upward. In this way, during a shutdown, the force of gravity tends to urge concentrate away from the sterile mixing zone. However, this effort has not been entirely successful. For example, in the case of a pulp-containing concentrate like orange juice pulp may float on the concentrate in the area of the mixing zone to contaminate the zone.

Another problem which can occur during a shutdown is degradation of product in the mixing chamber caused by prolonged exposure of the concentrate to high temperatures. There is therefore a need for a system wherein the temperature of the mixing chamber can be lowered during a shutdown and then raised again before restarting the system so as to avoid both product degradation during the shutdown and loss of aseptic conditions when the system is restarted.

Accordingly, it is an object of the present invention to provide a process for reconstituting beverages which can be interrupted and restarted without adversely affecting the sterility of the system.

It is a further object of the invention to provide an apparatus for reconstituting beverages having a mixing chamber whose temperature can be controlled during a shutdown of the apparatus so as to avoid product degradation caused by prolonged exposure of the beverage to high temperatures.

It is yet a further object of the invention to provide an apparatus for reconstituting beverages having a mixing chamber which can be adjusted so as to minimize its volume during a shutdown of the apparatus thereby allowing the chamber to be flushed with a small amount of water and permitting cooling and reheating of the chamber without the risk of altering the flavor or other qualities (e.g., Brix) of the product.

It is a further object of the invention to provide an apparatus of the type described above wherein a constant holding time may be provided for a product in the mixing chamber notwithstanding variations in the flow rate.

SUMMARY OF THE INVENTION

The invention provides a method and apparatus for reconstituting beverages wherein superheated constituting liquid and beverage concentrate are delivered into a mixing chamber. The mixing chamber is located between two coaxially arranged tapered elements which are disposed one inside of the other. Final beverage product emanates from an aperture in the tip of the outer tapered element. At least one tapered element can be displaced in the longitudinal direction so that the volume of the mixing chamber approaches zero as the tapered elements are moved colser together. Thus, when the system is shutdown, the volume of the mixing chamber is allowed to approach zero so that very little product is susceptible to degradation in the mixing chamber due to prolonged exposure to high temoeratures during a shutdown. In addition, the temperature of the mixing chamber can be controlled during a shutdown by adjusting the temperature of water contained within the walls of the tapered elements.

DETAILED DESCRIPTION

Figure 1:
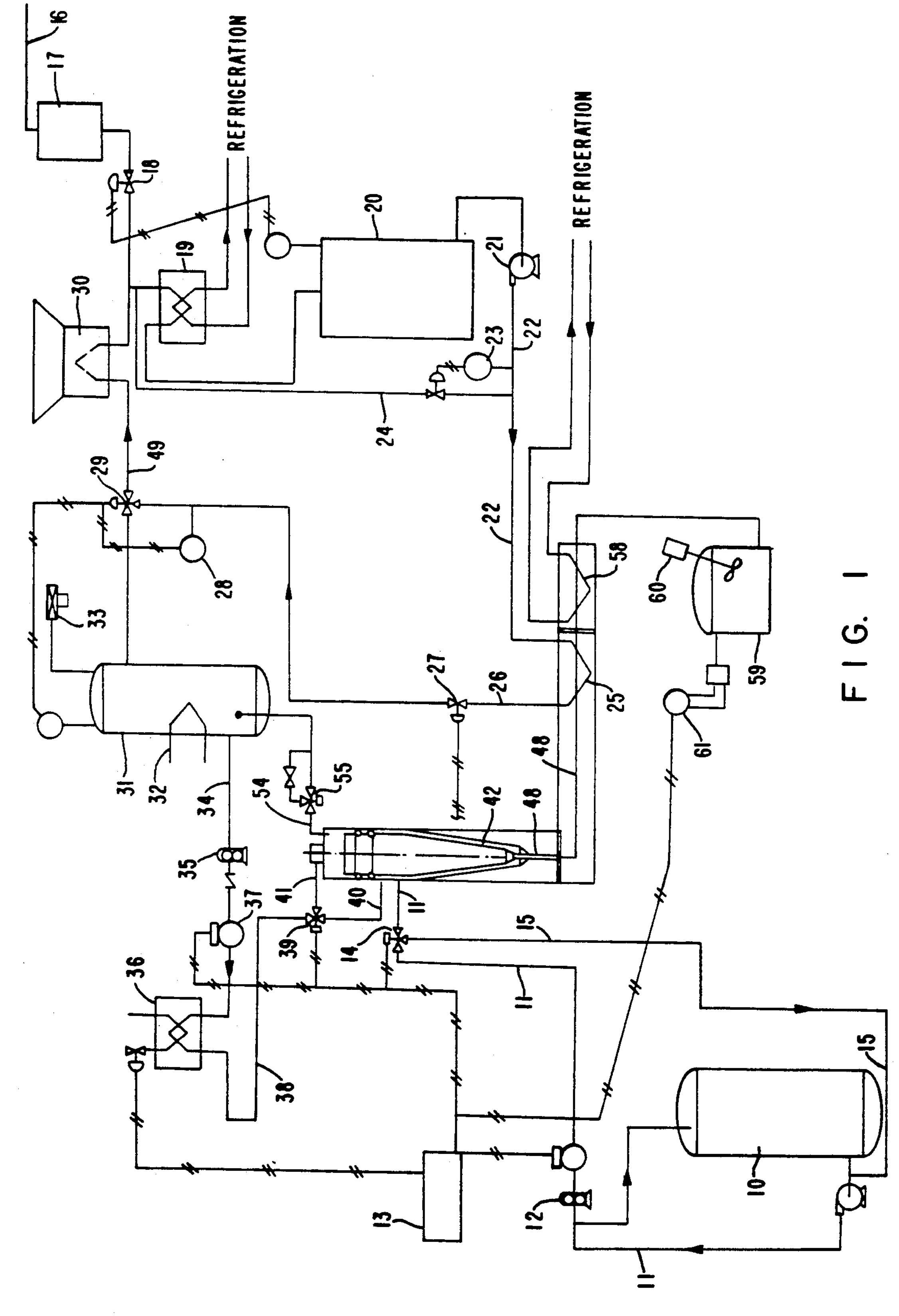
FIG. 1 is an overall view of the process and apparatus of the invention.

In order to facilitate the detailed description of the process and apparatus illustrated in the drawings, there is described a process for the reconstitution of an orange juice prepared by dilution from constituting water and a syrup or concentrate containing the basic ingredients of the juice. It should be appreciated, however, that the method and apparatus of the invention can be used with equal effectiveness on other reconstituting liquids and food products.

Referring to FIG. 1 there is shown a tank 10 for holding the syrup or concentrate which is to be reconstituted. Piping 11 connects tank 10 to the mixing chamber. A metering pump 12 pumps the syrup toward the mixing chamber at a present flow rate. Metering pump 12 and the flow rate are controlled by a control regulator 13. A valve 14 is disposed in piping 11 downstream from metering pump 12. In the making product mode, valve 14 is adjusted to direct the flow of syrup toward the mixing chamber 42. In the stop porduct mode, valve 14 is adjusted to redirect the syrup into return piping 15 back in the direction of tank 10 and piping 11 so that the flow of syrup into the mixing chamber is discontinued.

Water from a supply 16 is pumped through a filter 17 from a control valve 18 and then to a heat exchanger 19 where the temperature of the water is lowered for reasons which will later become apparent. The chilled water is then passed to a chilled water tank 20 where it may be stored during a stop product mode. During a making product mode, water from tank 20 is pumped by means of pump 21 through piping 22 to a temperature control sensor 23. If the temperature of the water is not low enough (i.e., about 35° F.), the water is recirculated back to heat exchanger 19 through piping 24. If the temperature of the water is sufficiently cool, it continues through piping 22 onto heat exchanger 25 where it is heated by heat from the final beverage product previously formed. At the same time, in heat exchanger 25, the final beverage product is cooled by the chilled water. In heat exchanger 25 the chilled water can be heated to a temperature of about 178° F.

The hot water is pumped through piping 26 from a control valve 27 which is coupled to control regulator 13 and which can be adjusted thereby. The water then passes a temperature control sensor 28. If the temperature control sensor 28 senses that the temperature of the water is below a predetermined level, for example about 178° F., a valve 29 is automatically adjusted to redirect the flow of water through piping 49 back to a cooling tower 30 and then back to heat exchanger 19. On the other hand, if the temperature of the water is sufficiently hot, valve 29 directs the water to hot water tank 31.

Hot water tank 31 includes a booster heater 32 to allow the temperature of the water to be maintained or raised if necessary. In the process of the invention the reconstituting water is deaerated by a conventional deaeration means 33 associated with the hot water tank 31. Deaeration of the reconstituting water reduces the risk of undesirable oxidation of vitamin C and flavor components of the product during blending. In this way flavor changes are avoided. The hot water tank 31 can also store reconstituting water during a stop product mode.

In the making product mode, deaerated water from tank 31 is pumped through piping 34 by pump 35 to superheater 36 where the water is superheated under pressure to temperatures in excess of its boiling point. The flow rate of water to the superheater can be adjusted by control means 37 linked to control regulator 13. As known to those skilled in the art, superheated water must be maintained under a pressure to prevent boiling. For example, the pressure can be on the order of about $18\times10^5$ Pa. The water must be heated to a temperature above the temperature at which heat treatment of the concentrate is to occur. For example, if a pasteurization of the syrup is to be carried out at 100° C., the reconstituting water could be superheated to about 135° C., the difference in temperature depending on the nature and the temperature of the syrup and its proportion in the final beverage product.

The superheated water is pumped toward the mixing chamber 42 at a preset flow rate through piping 38. Piping 38 includes a valve 39 downstream from pump 35. Valve 39 is also linked to control regulator 13. In the making product mode, valve 39 is adjusted to direct the flow of superheated water into the mixing chamber 42 through piping 40. In the stop product mode, the valve 39 is adjusted to redirect the water back to piping 41 and back to hot water tank 31 through a path which will be described hereinafter.

Figure 2:
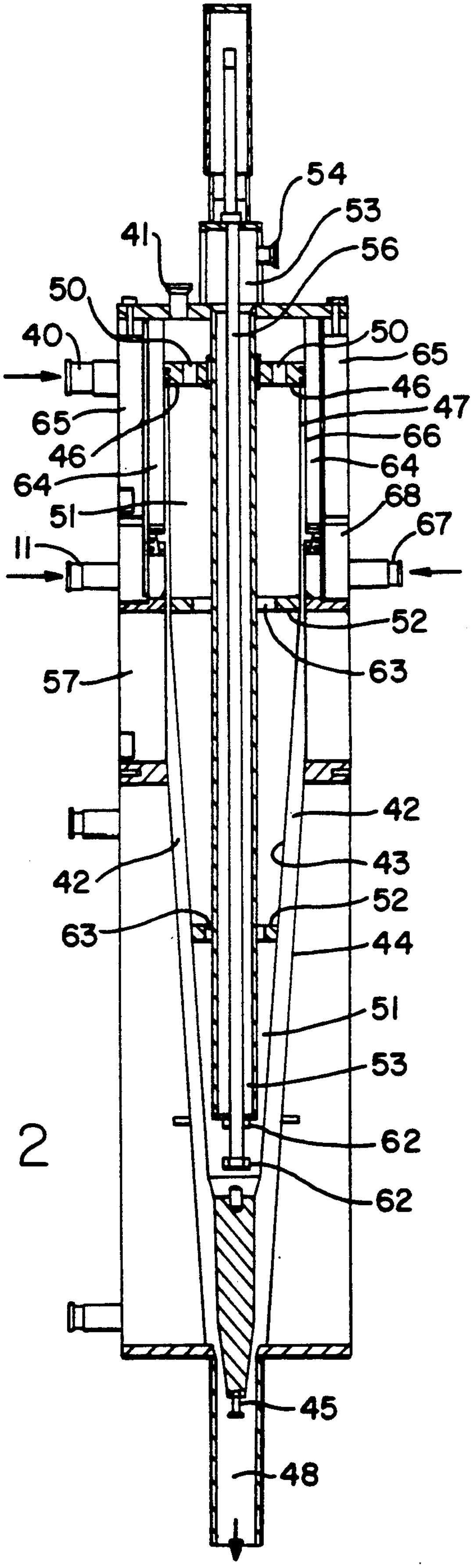
FIG. 2 is a detailed cross-sectional view of the mixing tube used in the present invention in the mode where product is being made.
Figure 3:
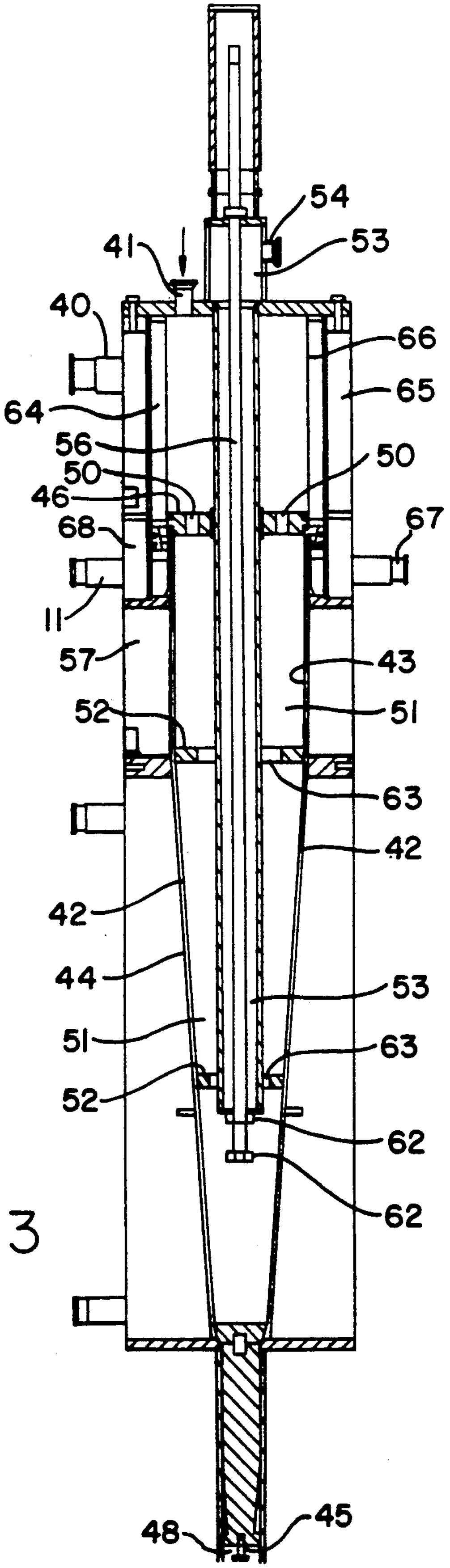
FIG. 3 is a detailed cross-sectional view of the mixing tube used in the present invention in a shutdown mode.

Referring to FIGS. 2 and 3 the mixing tube apparatus of the present invention will now be described. The mixing tube includes a mixing chamber 42 which is the volume between two tapered members 43 and 44. Members 43 and 44 can be hollow cylinders which are tapered at one of their respective ends as illustrated in FIG. 2. Preferably, the tapering of the cylindrical members is accomplished by making them conically shaped at one of their respective ends as illustrated in FIG. 2. However, it should be appreciated that other tapered shapes can be used. For example, the tapered ends could be concave, convex or spherical. What is important is that the shape of the members 43 and 44 be such that the volume of the mixing chamber between the tapered sections of the members 43 and 44 decreases and approaches zero as the members are moved closer together. For this purpose, members 43 and 44 are coaxially arranged. Inner member 43 can be displaced in the longitudinal direction along its axis thereby changing the volume of the mixing chamber 42. When it is desired to shutdown the system, inner member 43 is pushed down so that its tapered section is moved in closer proximity to the tapered section of outer member 44 thereby decreasing the volume of the mixing chamber 42 which approaches zero. In the stop product mode, the mixing chamber 42, whose volume is very small, can be closed by a back pressure valve 45 to prevent product from traveling downstream.

Inner member 43 is driven downward by a piston 46 which is mounted for movement within a cylinder 66 which is positioned on top of and concentric with outer member 44. When the system is operating in the making product mode, the flow of superheated water into an annulus 47, between the inside surface of cylinder 66 and the outside surface of the adjacent cylindrical section of inner member 43, urges piston 46 and inner member 43 upward thereby increasing the volume of the mixing chamber 42. Movement of inner member 43 and piston 46 can be limited in the upward direction by coaxially providing them with a threaded rod 56 along a longitudinal axis through their centers. The position beyond which the piston 46 and inner member 43 cannot pass in the upward direction can be adjusted using nuts 62 which cooperate with threaded rod 56. In this way, if desired, a maximum volume for the mixing chamber can be fixed by adjusting nuts 62 and rod 56.

Figure 4:
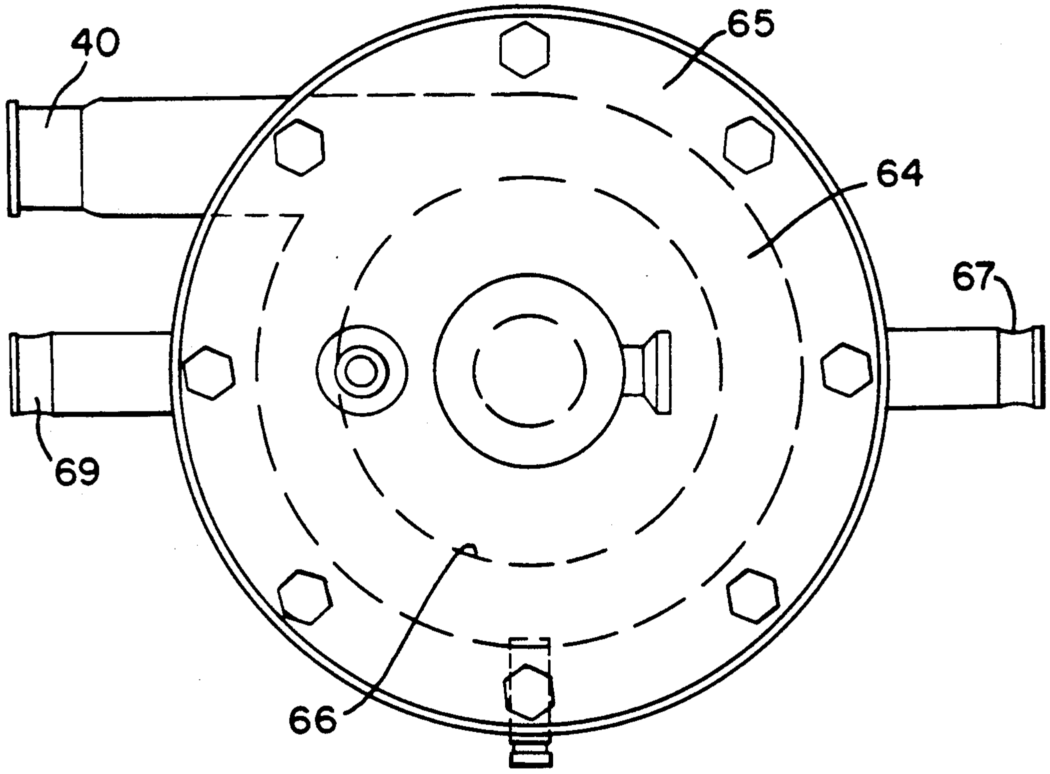
FIG. 4 is a top cross-sectional view of the mixing tube used in the present invention.

Product is reconstituted and sterilized by the high temperature of the superheated water in the mixing chamber. In the making product mode concentrate from piping 11 is directed into mixing chamber 42 through a port in outer member 44. Simultaneously, superheated water from piping 40 is directed into an upper annulus 64 through a port in an insulated wall 65 surrounding the mixing tube. Upper annulus 64 is the cavity between the outside surface of cylinder 66 and the insulated wall 65. It can be seen from the top view of FIG. 4 that the flow of superheated water into upper annulus 64 is almost tangential to the circular cross section of the annulus to ensure a uniform distribution of water into the annulus 64. Superheated water will circulate downward toward the mixing chamber 42 where it will mix with the concentrate.

It has been found that the best and most intimate mixing occurs in a thin conical mixing chamber (i.e., the tapered members are conical). Excellent results have been obtained where the mixing chamber 42 is only on the order of about 0.125 inches wide. The mixed aseptic beverage then flows out of the mixing chamber through an aperture in the tip of the outer chamber 44 and into piping 48 emanating from the aperture.

In order to shutdown the system, valve 14 is adjusted to direct syrup away from the mixing chamber in the manner previously described. Likewise, valve 39 is adjusted to redirect the flow of superheated water away from mixing chamber 42. The drip off in volume of water and syrup in the mixing chamber allows piston 46 to drop down. In addition, the superheated water will be directed by valve 39 into piping 41 which feeds into the top of the outer member 44 to force piston 46 down, thereby reducing the volume of the mixing chamber (see FIG. 3). Valve 45 should also be closed at this time. In this way, product which has not been completely sterilized in the mixing chamber is prevented from proceeding downstream from the mixing chamber thereby ensuring the sterility of the remainder of the system during a shutdown.

Piston 46 is formed with channel 50 which feeds into a water jacket 51 around the surface of inner member 43. Water from piping 41 forces piston 46 down and then is forced through channel 50 and into water jacket 51. The water flows down jacket 51 of inner member 43. If inner member 43 is formed with stiffening rings 52 for support, the stiffening rings 52 must also be formed with channels 63 to allow for water flow. The water is then forced back up center channel 53 of inner member 43. The top of center channel 53 feeds into piping 54 which carries the water past a pressure relief valve 55 back into hot water tank 31. During prolonged shutdowns, the flow of superheated water can be stopped at the source rather than redirected into piping 41.

During a shutdown, there is ordinarily a danger that product in the mixing chamber will degrade due to prolonged exposure of product to high temperatures. This danger is minimized in the present invention in three separate ways. First, in the closed position the volume of the mixing/holding chamber 42 is very small so that only a very small amount of product will be susceptible to degradation. Second, hot water trapped in the annulus 47 is sufficient to flush product from the mixing/holding chamber 42 and automatically flushes the space whenever the process is stopped, leaving essentially water in the chamber. Third, water jacket 51 of inner tapered member 43 is disposed adjacent to mixing chamber 42. Thus, in the stop product mode, the temperature of the mixing chamber 42 can be lowered by turning off or bypassing the heating elements of the system so as to circulate chilled water through water jacket 51 of the tapered member 43 to prevent product degradation. Before the system is started up again, the temperature of product in the mixing chamber can be raised by activating the heating elements and circulating hot or superheated water through the water jacket 51. Thus, the mixing chamber can be brought back to sterile conditions before valve 45 and the chamber are opened so that there is no danger of contaminated syrup coming in contact with the sterile downstream environment. It should be appreciated that the temperature of the material in the mixing chamber 42 can be quickly lowered and raised during the stop product mode because of the small volume of material present in the mixing chamber 42. For further efficiency in controlling the temperature of the mixing chamber 42, the outer member 44 may optionally be surrounded with insulation 57 immediately adjacent to mixing chamber 42.

In accordance with the present invention, it is also possible to regulate the temperature and viscosity of the concentrate prior to its entry into the mixing chamber. Water used to cool final beverage product in heat exchanger 25 can be directed through piping 67 (see FIG. 2) toward an annular chamber 68 in the mixing tube. Annular chamber 68 is adjacent to the extension of the piping 11 which directs concentrate into the mixing chamber. During the making product mode, the water which leaves from heat exchanger 25, after cooling the final product, will be hot. This hot water will enter annular chamber 68 through piping 67 and will warm the concentrate. This has the advantage of lowering the viscosity of the concentrate prior to its flow into the mixing chamber. On the other hand, during a shutdown the water which enters chamber 68 through piping 67 will be cold because there would be no hot final product in heat exchanger 25 from which to absorb heat. During a shutdown, the cold water in chamber 68 will help keep the concentrate cool to avoid product degradation. Water from chamber 68 exits from the mixing tube and returns to the system through piping 69 (see FIG. 4).

Product emanating from the mixing chamber 42 is passed downstream through piping 48. Piping 48 passes to heat exchanger 25 where the final product is cooled in the manner previously described. The reconstituted product is already sterile due to the action of the superheated water. No subsequent pasteurization steps are therefore necessary. The beverage product is then further cooled in a heat exchanger 58 and then passed onto a filler bowl 59 which may be provided with stirrer means 60 to evenly distribute pulp throughout the product prior to filling into containers. Also, filler bowl 59 may be provided with level control sensing means 61 linked to control regulator 13. It will be appreciated by those skilled in the art that the beverage product need not be stored in a storage tank prior to going to filler bowl 59 because the present system can stop and start up again rapidly.

It can be seen from the foregoing description that the invention provides a system for the aseptic reconstitution of beverages. In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather that a restrictive sense. It will be appreciated that the mixing/holding tube of the invention can have a wide variety of applications other than aseptic reconstitution of beverages. For example, the mixing/holding tube can be used in the preparation of pharmaceuticals, alcoholic beverages and various food products.

What is claimed is:

1. An apparatus for reconstituting beverages comprising:

a hollow outer tubular member which has a tapered end forming a tip, said tip having an aperture;

an inner tubular member which has a tapered end forming a tip, said inner tubular member being coaxially disposed inside of said hollow outer tubular member to define an annular mixing chamber therebetween, said inner tubular member being moveable along a longitudinal axis for varying the volume of said annular mixing chamber;

piston means coupled to said inner tubular member for longitudinal movement therewith inside of said hollow outer tubular member, said piston means being capable of longitudinal movement in a direction away from the tip of said outer tubular member in response to pressure from reconstituting liquid in said mixing chamber;

means for passing a reconstituting liquid into said mixing chamber;

means for passing a beverage concentrate into said mixing chamber; and means for receiving reconstituted beverage from the aperture of said hollow outer tubular member.

2. An apparatus according to claim 1 further comprising means for urging the piston means in the direction of the tip of said outer tubular member to move the tapered end of said inner tubular member in closer proximity to the tapered end of said hollow outer tubular member whereby the volume of said mixing chamber is reduced.

3. An apparatus according to claim 2 wherein the means for urging the piston means is a means for injecting liquid under pressure into said hollow outer tubular member against said piston means.

4. An apparatus according to claim 1 wherein said inner tubular member includes a jacket for receiving liquid alongside said mixing chamber.

5. An apparatus according to claim 4 wherein said outer tubular member includes a jacket for receiving liquid alongside said mixing chamber.

6. An apparatus according to claim 4 further comprising a means for adjusting the temperature of liquid to be passed into said jacket.

7. An apparatus according to claim 4 wherein the means for passing reconstituting liquid into said mixing chamber includes a valve which is adjustable to redirect said reconstituting liquid into the jacket of said inner tubular member.

8. An apparatus according to claim 7 wherein the inner tubular member includes a center channel along its longitudinal axis which communicates with the jacket of the inner tubular member for receiving a flow of water therefrom.

9. An apparatus according to claim 1 further comprising a shutoff valve in the vicinity of the aperture in the tip of said outer tubular member.

10. An apparatus according to claim 1 wherein said inner tubular member is hollow.

11. An apparatus according to claim 1 wherein the tapered end of each of the inner tubular member and the outer tubular member is conical and wherein each of the inner tubular member and the outer tubular member includes a non-tapered section which is cylindrical.

12. An apparatus for mixing and holding a plurality of materials comprising:

a hollow outer tubular member which has a tapered end forming a tip, said tip having an aperture;

an inner tubular member which has a tapered end forming a tip, said inner tubular member being coaxially disposed inside of said hollow outer tubular member to define an annular mixing chamber therebetweem, said inner tubular member being moveable along a longitudinal axis for varying the volume of said annular mixing chamber;

piston means coupled to said inner tubular member for longitudinal movement therewith inside of said hollow outer tubular member, said piston means being capable of longitudinal movement in a direction away from the tip of said outer tubular member in response to pressure from reconstituting liquid in said mixing chamber;

means for passing a first material into said mixing chamber;

means for passing a second material into said mixing chamber; and means for receiving mixed first and second material from the aperture of said hollow outer tubular member.

* * * * *